& Birch, LLP

United States Patent
Chu et al.

(10) Patent No.: US 11,059,938 B2
(45) Date of Patent: Jul. 13, 2021

(54) FILM COMPOSITION AND A FILM PREPARED THEREBY

(71) Applicant: Industrial Technology Research Institute, Hsinchu (TW)

(72) Inventors: Yen-Yi Chu, Miaoli (TW); Hsi-Yi Chin, Hsinchu (TW); Wei-Ta Yang, Taoyuan (TW); Chi-En Kuan, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 160 days.

(21) Appl. No.: 16/593,320

(22) Filed: Oct. 4, 2019

(65) Prior Publication Data

US 2020/0109234 A1    Apr. 9, 2020

Related U.S. Application Data

(60) Provisional application No. 62/741,835, filed on Oct. 5, 2018.

(30) Foreign Application Priority Data

Sep. 30, 2019 (CN) ............ 201910941870.1

(51) Int. Cl.
*C08G 61/02* (2006.01)
*C08L 65/00* (2006.01)

(52) U.S. Cl.
CPC ........... *C08G 61/02* (2013.01); *C08L 65/00* (2013.01); *C08G 2261/135* (2013.01); *C08G 2261/1412* (2013.01); *C08G 2261/1414* (2013.01); *C08G 2261/1426* (2013.01); *C08L 2203/16* (2013.01); *C08L 2312/00* (2013.01)

(58) Field of Classification Search
CPC ........... C08G 61/02; C08G 2261/135; C08G 2261/1412; C08G 2261/1414; C08G 2261/1426; C08L 65/00; C08L 2203/16; C08L 2312/00
USPC .......................................... 528/396
See application file for complete search history.

(56) References Cited

U.S. PATENT DOCUMENTS

| | | | |
|---|---|---|---|
| 5,182,360 A | 1/1993 | Jacobine et al. |
| 5,569,730 A | 10/1996 | Goodall et al. |
| 5,571,881 A | 11/1996 | Goodall et al. |
| 5,741,869 A | 4/1998 | Goodall et al. |
| 6,239,187 B1 | 5/2001 | Hatke et al. |
| 6,492,443 B1 | 12/2002 | Kodemura et al. |
| 7,122,611 B2 | 10/2006 | Lipian |
| 7,148,302 B2 | 12/2006 | Lipian |
| 7,253,245 B2 | 8/2007 | Wu |
| 7,291,689 B1 | 11/2007 | Lee et al. |
| 7,381,782 B2 | 6/2008 | Sugawara et al. |
| 8,053,531 B2 | 11/2011 | Hirata et al. |
| 8,568,891 B2 | 10/2013 | Mizuno et al. |
| 8,609,005 B2 | 12/2013 | Takeyama et al. |
| 8,685,510 B2 | 4/2014 | Takahashi et al. |
| 8,748,541 B2 | 6/2014 | Mori et al. |
| 9,181,360 B2 | 11/2015 | Holtcamp et al. |

(Continued)

FOREIGN PATENT DOCUMENTS

| | | |
|---|---|---|
| CN | 1043662 A | 7/1990 |
| CN | 1135225 A | 11/1996 |

(Continued)

OTHER PUBLICATIONS

Floros et al., "Statistical Copolymers of Norbornene and 5-Vinyl-2-norbornene by a Ditungsten Complex Mediated Ring-Opening Metathesis Polymerization: Synthesis, . . . Thermal Decomposition," Journal of Polymer Science, vol. 51,2013 (published online Sep. 16, 2013), pp. 4835-4844. (Year: 2013).*

(Continued)

*Primary Examiner* — Ling Siu Choi
*Assistant Examiner* — Ronald Grinsted
(74) *Attorney, Agent, or Firm* — Birch, Stewart, Kolasch & Birch, LLP

(57) ABSTRACT

The disclosure provides a film composition, wherein the film composition includes an oligomer and a crosslinking agent. The oligomer can have a structure represented by Formula (I)

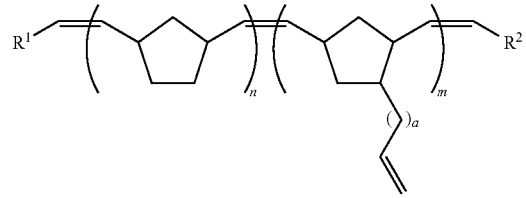

Formula (I)

wherein $R^1$ and $R^2$ are independently hydrogen, $C_{1-20}$ alkyl group, $C_{2-20}$ alkenyl group, $C_{6-12}$ aryl group, $C_{6-12}$ alkylaryl group, $C_{5-12}$ cycloalkyl group, $C_{6-20}$ cycloalkylalkyl group, alkoxycarbonyl group, or alkylcarbonyloxy group; $R^1$ is not hydrogen when $R^2$ is hydrogen; a is 0 or 1; $100 \geq n \geq 1$; $100 \geq m \geq 1$; and when n is not 0, the ratio of n to m is from 3:1 to 1:4. The weight ratio of the oligomer and the crosslinking agent can be from 9:1 to 3:7. The oligomer has a number average molecular weight (Mn) from 1,000 to 8,000.

14 Claims, No Drawings

(56) References Cited

U.S. PATENT DOCUMENTS

| | | |
|---|---|---|
| 9,243,132 B2 | 1/2016 | Fung et al. |
| 2007/0255031 A1 | 11/2007 | Lee et al. |
| 2010/0063226 A1 | 3/2010 | Cho et al. |
| 2017/0342199 A1 | 11/2017 | Yang et al. |
| 2017/0342200 A1 | 11/2017 | Hong et al. |
| 2018/0171068 A1 | 6/2018 | Yang et al. |

FOREIGN PATENT DOCUMENTS

| | | |
|---|---|---|
| CN | 1229094 A | 9/1999 |
| CN | 102115569 A | 7/2011 |
| CN | 103013206 A | 4/2013 |
| CN | 102660111 B | 9/2013 |
| CN | 103232562 B | 8/2015 |
| CN | 105555814 A | 5/2016 |
| CN | 106893092 A | 6/2017 |
| CN | 107417891 A | 12/2017 |
| CN | 108250720 A | 7/2018 |
| EP | 0807998 B1 | 10/2001 |
| JP | 2522653 B2 | 8/1996 |
| JP | 3588498 B2 | 11/2004 |
| JP | 3971476 B2 | 9/2007 |
| JP | 3978832 B2 | 9/2007 |
| JP | 2007-277572 A | 10/2007 |
| JP | 4313849 B2 | 8/2009 |
| JP | 2010-106219 A | 5/2010 |
| JP | 4548491 B2 | 9/2010 |
| JP | 4754039 B2 | 8/2011 |
| JP | 2011-233422 A | 11/2011 |
| JP | 5278305 B2 | 9/2013 |
| JP | 5278306 B2 | 9/2013 |
| JP | 2015-100984 A | 6/2015 |
| JP | 5810531-82 | 11/2015 |
| JP | 2016-190988 A | 11/2016 |
| TW | 201219432 A1 | 5/2012 |
| TW | 201823294 A | 7/2018 |
| WO | WO 2008/081885 A1 | 7/2008 |

OTHER PUBLICATIONS

EIC STN Search (Year: 2021).*

Balcar et al., "Ring-opening metathesis polymerization of vinylnorbornene and following polymer modifications," Journal of Polymer Research, vol. 21, No. 557, Sep. 2014 (published online Aug. 9, 2014), pp. 1 of 8-8 of 8.

Balcar et al., "$RuCl_2$ (p-cymene)($PCy_3$) immobilized on mesoporous molecular sieves as catalyst for ROMP of norbornene and its derivatives," Journal of Molecular Catalysis A: Chemical, vol. 332, 2010 (available online Aug. 14, 2010), pp. 19-24.

Bielawski et al, "Synthesis of End-Functionalized Poly(norbornene)s via Ring-Opening Metathesis Polymerization," Macromolecules, 2001, vol. 34, pp. 8610-8618.

Endo et al., "Polymerization of 5-vinyl-2-norbornene with $TiCl_3$ and alkylaluminium catalysts," Macromolecular Chemistry and Physics, vol. 197, Issue 1, Jan. 1996, pp. 97-104.

Floros et al., "Statistical Copolymers of Norbornene and 5-Vinyl-2-norbornene by a Ditungsten Complex Mediated Ring-Opening Metathesis Polymerization: Synthesis, . . . Thermal Decomposition," Journal of Polymer Science, vol. 51, 2013 (published online Sep. 16, 2013), pp. 4835-4844.

Górski et al., "Tungsten(II)-initiated ring-opening metathesis polymerization and other C-C bond forming reactions of 5-vinyl-2-norbornene," Journal of Molecular Catalysis A: Chemical, vol. 257, 2006 (available online May 5, 2006), pp. 41-47.

Janiak et al., "The Vinyl Homopolymerization of Norbornene," Macromolecular Rapid Communications, 2001, vol. 22. No. 7, pp. 479-492.

Martin et al., "Development of a Low-Dielectric-Constant Polymer for the Fabrication of Integrated Circuit Interconnect," Advanced Materials, vol. 12, No. 23, Dec. 1, 2000, pp. 1769-1778.

Taiwanese Office Action and Search Report for Appl. No. 105143833 dated Jun. 26, 2017.

Taiwanese Office Action and Search Report for Appl. No. 105144141 dated Apr. 19, 2017.

Sheng et al., "Influence of Cross-link Density on the Properties of ROMP Thermosets," Polymer, vol. 50, 2009 (Available online Jan. 15, 2009), pp. 1264-1269.

Chinese Office Action and Search Report for Chinese Application No. 201711391873.X, dated Nov. 1, 2019.

Chinese Office Action and Search Report, dated Mar. 2, 2021, for Chinese Application No. 201910941870.1.

Chinese Office Action for Appl. No. 201711391873.X dated Aug. 4, 2020.

He, Man-Jn, "Polymer Physics", Mar. 31, 2007. Fudan University Press, pp. 52 (w/ English Abstract).

Pan, Zu-Ren, "Polymer chemistry", Jun. 30, 1986, Chemical Industry Press Co, Ltd., pp. 49 (w/ English Abstract).

Taiwanese Office Action and Search Report for Taiwanese Application No. 108135998, dated Dec. 24, 2020.

* cited by examiner

FILM COMPOSITION AND A FILM PREPARED THEREBY

CROSS REFERENCE TO RELATED APPLICATIONS

This application claims the benefit of U.S. Provisional Application No. 62/741,835, filed on Oct. 5, 2018, which is hereby incorporated herein by reference.

This application claims the benefit of Chinese Application No. CN201910941870.1, filed on Sep. 30, 2019, the disclosure of which is hereby incorporated by reference herein in its entirety.

TECHNICAL FIELD

The technical field relates to a film composition and a film thereof.

BACKGROUND

In recent years, with the development of optical communication technology, materials, which are lower in cost and exhibit higher performance, are desired in order to fabricate optical communication devices. Therefore, optical communication materials prepared from polymers become increasingly important. However, when a conventional polymer material is used as an optical communication material, various problems (such as low heat resistance, low light transmittance, or low glass transition temperature) may arise.

Accordingly, the industry needs a novel polymer material to overcome the problems mentioned above.

SUMMARY

The disclosure provides a film composition, wherein the film composition includes an oligomer and a crosslinking agent. The oligomer can have a structure represented by Formula (I)

Formula (I)

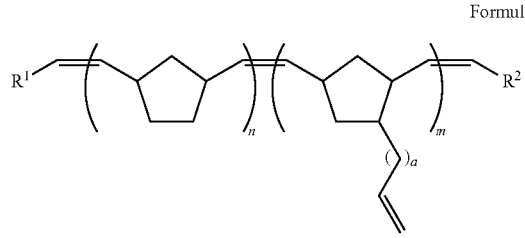

wherein $R^1$ and $R^2$ are independently hydrogen, $C_{1-20}$ alkyl group, $C_{2-20}$ alkenyl group, $C_{6-12}$ aryl group, $C_{6-12}$ alkylaryl group, $C_{5-12}$ cycloalkyl group, $C_{6-20}$ cycloalkylalkyl group, alkoxycarbonyl group, or alkylcarbonyloxy group; $R^1$ is not hydrogen when $R^2$ is hydrogen; a is 0 or 1; n≥0; m≥1, wherein the ratio of n to m can be from 3:1 to 1:4 (such as from 3:1 to 1:3 or from 2:1 to 1:2) when n is not 0. The crosslinking agent can be a compound having at least two crosslinkable functional groups or bismaleimide, wherein the crosslinkable functional group can be $C_{2-5}$ alkenyl group, acrylate group, acryloyl group, epoxy group or carboxyl group. Furthermore, the weight ratio of the oligomer and the crosslinking agent can be from 9:1 to 3:7, such as from 8:2 to 3: 7, from 7:3 to 3:7, from 6:4 to 4:6, from 9:1 to 5:5, or from 8:2 to 5:5. Due to the specific ratio of the repeat unit

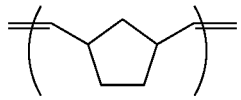

to the repeat unit

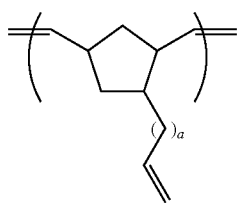

and the specific weight ratio of the oligomer to the crosslinking agent, the film composition can exhibit a superior film-forming ability. As a result, the film composition can be subjected to a crosslinking reaction under a specific temperature to form a film on the premise that the film composition does not have any resin or polymer.

Moreover, the disclosure also provides a film which is the cured product prepared from the film composition. The cured product prepared from the film composition has a low dielectric constant (Dk) and a low dissipation factor (Df). In addition, the cured product prepared from the film composition also exhibits high transparency, high refractive index, high glass transition temperature and high thermal stability.

A detailed description is given in the following embodiments with reference to the accompanying drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

The disclosure relates to a film composition and a film (i.e. cured product) prepared from the film composition. The film prepared from the film composition can have a low dielectric constant (Dk), low dissipation factor (Df), high transparency, high refractive index, high glass transition temperature and high thermal stability, thereby being suitable for use in optoelectronic elements (such as printed circuit boards or optical waveguide devices).

According to embodiments of the disclosure, the disclosure provides a film composition. The film composition includes an oligomer and a crosslinking agent. The oligomer can have a structure represented by Formula (I)

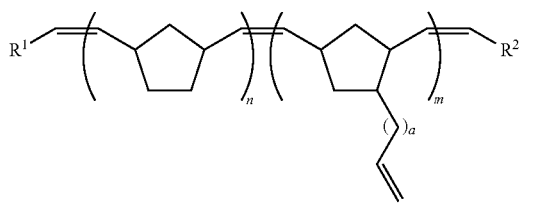

Formula (I)

wherein $R^1$ and $R^2$ are independently hydrogen, $C_{1-20}$ alkyl group, $C_{2-20}$ alkenyl group, $C_{6-12}$ aryl group, $C_{6-12}$ alkylaryl group, $C_{5-12}$ cycloalkyl group, $C_{6-20}$ cycloalkylalkyl group, alkoxycarbonyl group, or alkylcarbonyloxy group; $R^1$ is not hydrogen when $R^2$ is hydrogen; a is 0 or 1; n≥0 (such as 100≥n≥1); and m≥1 (such as 100≥m≥1). For example, n can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more than 100; and m can be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more than 100. The ratio of n to m is from 3:1 to 1:4, when n is not 0.

According to embodiments of the disclosure, the oligomer can have a number average molecular weight (Mn) from 1,000 to 8,000, such as from about 1,000 to 7,500, from about 1,000 to 7,000, from about 1,000 to 6,000, or from about 1,000 to 5,000. As a result, the oligomer can have high solubility in organic solvent, thereby enhancing the processability of the oligomer. In addition, in comparison with the coploymer merely prepared from vinyl norbornene and norbornene, the oligomer of the disclosure exhibits superior storability. According to embodiments of the disclosure, the repeat unit

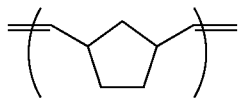

and the repeat unit

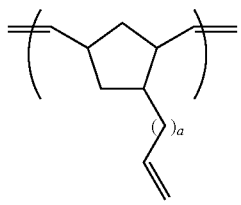

are arranged in a random or block fashion. If the number average molecular weight (Mn) of the oligomer is too large, the cured product prepared from the film composition exhibits poor processability. Furthermore, if the number average molecular weight (Mn) of the oligomer is too low, the cured product prepared from the film composition exhibits poor thermal endurance.

For example, $R^1$ and $R^2$ can be independently a linear or branched alkyl group having 1, 2, 3, 4, 5, 6, 7, 8, 9, 10, 11, 12, 13, 14, 15, 16, 17, 18, 19, or 20 carbon atoms. According to embodiments of the disclosure, the alkenyl group of the disclosure can be linear or branched alkenyl group. $R^1$ and $R^2$ can be independently a linear or branched alkenyl group having 2, 3, 4, 5, 6, 7, 8, 9, 10, 11, 12, 13, 14, 15, 16, 17, 18, 19, or 20 carbon atoms.

According to embodiments of the disclosure, $R^1$ and $R^2$ can be independently hydrogen, or

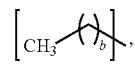

wherein b can be 0, 1, 2, 3, 4, 5, 6, 7, 8, 9, 10, 11, 12, 13, 14, 15, 16, 17, 18, or 19; and $R^1$ is not hydrogen when $R^2$ is hydrogen. According to embodiments of the disclosure, the $C_{6-12}$ aryl group of the disclosure can be phenyl group, biphenyl group, or naphthyl group.

According to embodiments of the disclosure, $R^1$ and $R^2$ are independently hydrogen, or

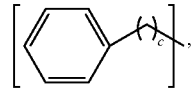

wherein c can be 0, 1, 2, 3, 4, 5, or 6; and $R^1$ is not hydrogen when $R^2$ is hydrogen.

According to embodiments of the disclosure, $R^1$ and $R^2$ can be independently hydrogen, or

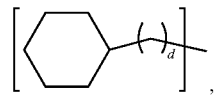

wherein d can be 0, 1, 2, 3, 4, 5, or 6; and $R^1$ is not hydrogen when $R^2$ is hydrogen.

According to embodiments of the disclosure, $R^1$ and $R^2$ can be independently hydrogen, or

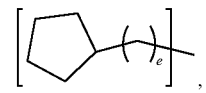

wherein e can be 0, 1, 2, 3, 4, 5, or 6; and $R^1$ is not hydrogen when $R^2$ is hydrogen.

According to embodiments of the disclosure, $R^1$ and $R^2$ can be independently hydrogen, or

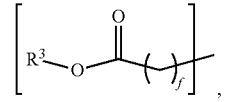

wherein f can be 0, 1, 2, 3, 4, 5, or 6; $R^3$ can be $C_{1-6}$ alkyl group; and $R^1$ is not hydrogen when $R^2$ is hydrogen. For example, $R^3$ can be methyl group, ethyl group, propyl group, isopropyl group, butyl group, isobutyl group, tert-butyl group, pentyl group, or hexyl group.

According to embodiments of the disclosure, $R^1$ and $R^2$ can be independently hydrogen, or

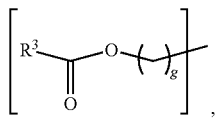

wherein g can be 0, 1, 2, 3, 4, 5, or 6; $R^4$ can be $C_{1-6}$ alkyl group; and $R^1$ is not hydrogen when $R^2$ is hydrogen. For example, $R^4$ can be methyl group, ethyl group, propyl group, isopropyl group, butyl group, isobutyl group, tert-butyl group, pentyl group, or hexyl group.

According to embodiments of the disclosure, $R^1$ and $R^2$ can be independently hydrogen, or

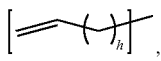

wherein h can be 1, 2, 3, 4, 5, or 6; and $R^1$ is not hydrogen when $R^2$ is hydrogen.

According to embodiments of the disclosure, $R^1$ and $R^2$ can be independently hydrogen, or

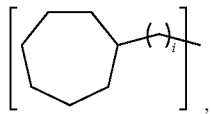

wherein i can be 0, 1, 2, 3, 4, 5, or 6; and $R^1$ is not hydrogen when $R^2$ is hydrogen.

According to embodiments of the disclosure, $R^1$ and $R^2$ can be independently hydrogen, or

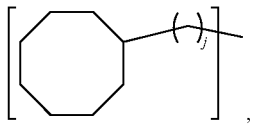

wherein j can be 0, 1, 2, 3, 4, 5, or 6; and $R^1$ is not hydrogen when $R^2$ is hydrogen.

The ratio of n to m can be from 3:1 to 1:4, such as from 3:1 to 1:3, from 2:1 to 1:2, or about 1:1. When the ratio of n to m is too low or too high, the film composition including the oligomer cannot form a film after curing due to the inferior film-forming ability of the film composition. As a result, the film composition cannot transfer to a film after curing.

According to an embodiment of the disclosure, the oligomer can be uniformly distributed in the crosslinking agent. As a result, the film composition of the disclosure can be free of solvent. According to an embodiment of the disclosure, the film composition of the disclosure can further include a solvent in order to dissolve the oligomer and the crosslinking agent. Therefore, the oligomer and the crosslinking agent can be dissolved in the solvent uniformly. According to embodiments of the disclosure, the solvent can have a weight percentage from about 1 wt % to 500 wt %, based on the total weight of the oligomer and the crosslinking agent. The solvent can be an aromatic hydrocarbon solvent, alcohol, ether, ketone, ester, nitrogen-containing solvent, or a combination thereof. For example, the solvent can be benzene, toluene, xylene, mesitylene, methanol, ethanol, butanol, ethyl cellosolve, butyl cellosolve, ethylene glycol monomethyl ether, carbitol, butyl carbitol, acetone, methyl ethyl ketone, methyl isobutyl ketone, cyclohexanone, methoxyethyl acetate, ethoxyethyl acetate, butoxyethyl acetate, ethyl acetate, propylene glycol monomethyl ether acetate (PGMEA), N-dimethylformamide, N,N-dimethylacetamide, N-methyl-2-pyrrolidone, or a combination thereof.

According to embodiments of the disclosure, the film composition can further an additive, wherein the additive can be initiator, leveling agent, filler, colorant, defoamer, flame retardant, or a combination thereof. According to embodiments of the disclosure, the additive can have a weight percentage from about 1 wt % to 50 wt %, based on the total weight of the oligomer and the crosslinking agent.

According to embodiments of the disclosure, the film composition consists of an oligomer and a crosslinking agent. According to embodiments of the disclosure, the film composition consists of a solvent, an oligomer and a crosslinking agent.

The crosslinking agent can be a compound having at least two crosslinkable functional groups (such as having two crosslinkable functional groups, having three crosslinkable functional groups, having four crosslinkable functional groups, or having five crosslinkable functional groups) or bismaleimide, wherein the crosslinkable functional group can be $C_{2-5}$ alkenyl group (such as vinyl group, allyl group, butenyl group, 1,3-butanedienyl group, 1-methyl vinyl group, 1-methyl allyl group, 1,1-dimethyl allyl group, 2-methyl allyl group, or 1,2-dimethyl allyl group), methacrylate group, acrylate group, acryloyl group, epoxy group or carboxyl group, or a combination thereof.

According to embodiments of the disclosure, the crosslinking agent can have a number average molecular weight (Mn) of less than or equal to 600, such as from about 50 to 550, from about 60 to 550, from about 70 to 550, from about 80 to 500, or from about 90 to 500. According to embodiments of the disclosure, the crosslinking agent can include methacrylate-type agents, such as: SR205H (triethylene glycol dimethacrylate (TiEGDMA)), SR206H (ethylene glycol dimethacrylate (EGDMA)), SR209 (tetraethylene glycol dimethacrylate (TTEGDMA)), SR210HH (polyethylene glycol (200) dimethacrylate (PEG200DMA)), SR214 (1,4-butanediol dimethacrylate (BDDMA)), SR231 (diethylene glycol dimethacrylate (DEGDMA)), SR239A (1,6-hexanediol dimethacrylate (HDDMA)), SR252 (polyethylene glycol (600) dimethacrylate (PEG600DMA)), SR262 (1,12-dodecanediol dimethacrylate (DDDDMA)), SR297J (1,3-butylene glycol dimethacrylate (BGDMA)), SR348C (ethoxylated 3 bisphenol A dimethacrylate (BPA3EODMA)), SR348L (ethoxylated 2 bisphenol A dimethacrylate (BPA2EODMA)), SR350D (trimethylolpropane trimethacrylate (TMPTMA)), SR480 (ethoxylated 10 bisphenol A dimethacrylate (BPA10EODMA)), SR540 (ethoxylated 4 bisphenol A dimethacrylate (BPA4EODMA)), SR596 (alkoxylated pentaerythritol tetramethacrylate (PETTMA)), SR604 (polypropylene glycol monomethacrylate (PPGMA)), and SR834 (tricyclodecanedimethanol dimethacrylate (TCDDMDMA)).

According to embodiments of the disclosure, the crosslinking agent can include acrylate-type agents, such as: dipentaerythritol hexaacrylate (DPHA), SR238 (1,6-hexanediol diacrylate (HDDA)), SR259 (polyethylene glycol (200) diacrylate (PEG200DA)), SR268G (tetraethylene glycol diacrylate (TTEGDA)), SR272 (triethylene glycol diacrylate (TIEGDA)), SR295 (pentaerythritol tetraacrylate (PETTA)), SR306 (tripropylene glycol diacrylate (TPGDA)), SR307 (polybutadiene diacrylate (PBDDA)), SR341 (3-methyl 1,5-pentanediol diacrylate (MPDA)), SR344 (polyethylene glycol (400) diacrylate (PEG400DA)), SR349 (ethoxylated 3 bisphenol A diacrylate (BPA3EODA)), SR351 (trimethylolpropane triacrylate (TMPTA)), SR355 (di-trimethylolpropane tetraacrylate (Di-TMPTTA)), SR368 (tris (2-hydroxyethyl) isocyanurate triacrylate (THEICTA)), SR399 (dipentaerythritol pentaacrylate (DPPA)), SR415 (ethoxylated (20) trimethylolpropane triacrylate (TMP20EOTA)), SR444D (pentaerythritol triacrylate (PETIA)), SR454 (ethoxylated 3 trimethylolpropane triacrylate (TMP3EOTA)), SR492 (propoxylated 3 trimethylolpropane triacrylate (TMP3POTA)), SR494 (ethoxylated pentaerythritol tetraacrylate), SR499 (ethoxylated 6 trimethylolpropane triacrylate (TMP6EOTA)), SR502 (ethoxylated 9 trimethylolpropane triacrylate (TMP9EOTA)), SR508 (dipropylene glycol diacrylate (DPGDA)), SR595 (1,10-decanediol diacrylate (DDDA)), SR601E (ethoxylated 4 bisphenol A diacrylate (BPA4EODA)), SR602 (ethoxylated 10 bisphenol A diacrylate (BPA10EODA)), SR606A (esterdiol diacrylate (EDDA)), SR610 (polyethylene glycol 600 diacrylate (PEG600DA)), SR802 (alkoxylated diacrylate), SR833S (tricyclodecanedimethanol diacrylate (TCDDMDA)), SR9003 (propoxylated 2 neopentyl glycol diacrylate (PONPGDA)), SR9020 (propoxylated 3 glyceryl triacrylate (GPTA)), SR9035 (ethoxylated 15 trimethylolpropane triacrylate (TMP15EOTA)), and SR9046 (ethoxylated 12 glyceryl triacrylate (G12EOTA)).

According to embodiments of the disclosure, the crosslinking agent can include allylic-type agents, such as: triallyl cyanurate (TAC), triallyl isocyanurate (TAIC), triallylphosphate (TAP), triallyl borate (TAB), trimethallyl isocyanurate (TMAIC), diallylterephthalate (DATP), diallyl carbonate, diallyl maleate, diallyl fumarate, diallyl phosphite, trimethylolpropane diallyl ether, and 1,1,2,2-Tetraallyloxyethane.

According to embodiments of the disclosure, the crosslinking agent can include vinylic-type agents, such as: bis (4-vinylphenyl) ethane (BVPE), bis (4-vinylphenyl) methane, 1,4-butadiene, divinylacetylene, divinylbenzene (DVB), divinyl ether, divinyl sulfide, divinyl sulfone, divinyl sulfoxide, 1,3-divinylcyclohexane, 1,3-divinylcyclopentane, 1,5-hexadiene, isoprene, and 1,2,4-trivinyl cyclohexane (TVCH).

According to embodiments of the disclosure, the crosslinking agent can include hybrid-type agents, such as: allyl methacrylate, and allyl acrylate.

According to embodiments of the disclosure, the crosslinking agent can include bismaleimide. The bismaleimide can have a structure represented by Formula (II) or Formula (III)

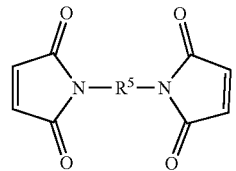

Formula (II)

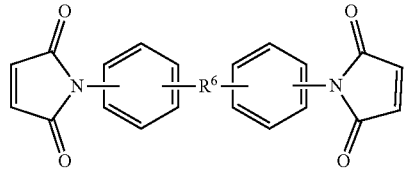

Formula (III)

In the formulae, $R^5$ may be —$CR_2$—, —NR—, —C(O)$CH_2$—, —$CH_2OCH_2$—, —C(O)—, —O—, —O—O—, —S—, —S—S—, —S(O)—, —$CH_2S(O)CH_2$—, —(O)S(O)—, —$C_6R_4$—, —$CH_2(C_6R_4)CH_2$—, —$CH_2(C_6R_4)$(O)—, substituted or non-substituted diphenylene; $R^6$ may be —$CR_2$—, —C(O)—, —O—, —O—O—, —S—, —S—S—, —(O)S(O)— or —S(O)—; and R may be independently hydrogen or $C_{1-4}$ alkyl. In the aforementioned group (or moiety), the term "(O)" means a double bond is formed between the oxygen atom and the carbon atom (or sulfur atom). In particular, the term "substituted diphenylene" means at least one hydrogen atom bonded to carbon atoms of the diphenylene can be replaced with $C_{1-6}$ alkyl group. The bismaleimide can be N,N'-bismaleimide-4,4'-diphenylmethane, 1,1'-(methylenedi-4,1-phenylene)bismaleimide, N,N'-(1,1'-biphenyl-4,4'-diyl) bismaleimide, N,N'-(4-methyl-1,3-phenylene)bismaleimide, 1,1'-(3,3'dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, N,N'-thiodimaleimide, N,N'-dithiodimaleimide, N,N'-ketonedimaleimide, N,N'-methylene-bis-maleinimide, bis-maleinimidomethyl-ether, 1,2-bis-(maleimido)-1,2-ethandiol, N,N'-4,4'-diphenylether-bis-maleimid, 4,4'-bis(maleimido)-diphenylsulfone, or a combination thereof.

According to embodiments of the disclosure, the weight ratio of the oligomer and the crosslinking agent can be from 9:1 to 3:7, such as from about 8:2 to 2:8, from about 7:3 to 3:7, from about 6:4 to 4:6, from about 9:1 to 5:5, or from about 8:2 to 5:5. For example, the weight ratio of the oligomer and the crosslinking agent can be about 9:1, 8:2, 7:3, 6:4, 5:5, 4:6, or 3:7. Due to the specific weight ratio of the oligomer to the crosslinking agent, the film composition can exhibit a superior film-forming ability.

According to embodiments of the disclosure, the film composition is free of resin. In particular, the resin includes polyolefin resin (such as polybutadiene resin, polyalkenamer resin, cyclic olefin polymer resin, or cycloolefin copolymer resin), epoxy resin, cyanate resin, polystyrene resin, polybenzoxazole resin, polybenzocyclobutene resin, polyarylene ether resin, polysiloxane resin, polyester resin, styrene-butadiene copolymer resin, polyimide resin, maleimide resin, or polyphenylene ether resin.

The cured product prepared from the film composition has a refractive index from about 1.3001 to 1.8999, and a glass transition temperature from about 140° C. to 300° C. According to an embodiment of the disclosure, the disclosure also provides a cured product of the film composition. According to embodiments of the disclosure, the film composition of the disclosure can be crosslinked at a temperature less than 250° C. (such as from 60° C. to 200° C., from 80° C. to 180° C., or from 100° C. to 150° C., or from 120° C. to 140° C.) to obtain the cured product.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation of Oligomer

Preparation Example 1

0.09 g of 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 15 ml of toluene was added into the first reaction bottle, obtaining a metal-catalyst-containing solution. After the metal catalyst was dissolved in toluene completely, 0.483 mol of 1-hexene, 98.4 g of vinyl norbornene (VNB), and 170 ml of toluene were added into a second reaction bottle. Next, the metal-catalyst-containing solution in the first reaction bottle was added into the second reaction bottle. After stirring completely, a norbornene-containing solution (153.8 g of norbornene (NB) dissolved in 190 ml of toluene) was added into the second reaction bottle. Herein, 1-hexene had a molar percentage of 20 mol %, based on the total moles of vinyl norbornene (VNB) and norbornene. After the reaction was complete, 130 ml of ethyl vinyl ether was added into the second reaction bottle. After stirring overnight, the catalyst of the result was removed and then was purified by a reprecipitation with methanol. After concentration, Oligomer (I) (with a number average molecular weight (Mn) of 2,048) was obtained, wherein the ratio of the repeat unit

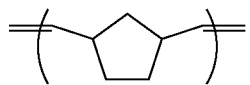

to the repeat unit

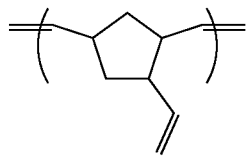

of Oligomer (I) was about 2:1.

Preparation Example 2

0.045 g of 1,3-bis(2,4,6-trimethylphenyl)-4,5-dihydro-imidazol-2-ylidene[2-(i-propoxy)-5-(N,N-dimethylamino-sulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.604 mol of 1-hexene, 73.6 g of vinyl norbornene (VNB), and 128 ml of toluene were added into a second reaction bottle. Next, the metal-catalyst-containing solution in the first reaction bottle was added into the second reaction bottle. After stirring completely, a norbornene-containing solution (57.7 g of norbornene (NB) dissolved in 50 ml of toluene) was added into the second reaction bottle. Herein, 1-hexene had a molar percentage of 50 mol %, based on the total moles of vinyl norbornene (VNB) and norbornene. After the reaction was complete, 63 ml of ethyl vinyl ether was added into the second reaction bottle. After stirring overnight, the catalyst of the result was removed and then was purified by a reprecipitation with methanol. After concentration, Oligomer (II) (with a number average molecular weight (Mn) of 1,033) was obtained, wherein the ratio of the repeat unit

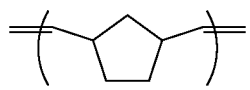

to the repeat unit

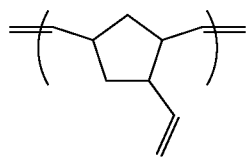

of Oligomer (II) was about 1:1.

Preparation Example 3

0.18 g of 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 30 ml of toluene was added into the first reaction bottle, obtaining a metal-catalyst-containing solution. After the metal catalyst was dissolved in toluene completely, 0.967 mol of 1-hexene, 392.7 g of vinyl norbornene (VNB), and 620 ml of toluene were added into a second reaction bottle. Next, the metal-catalyst-containing solution in the first reaction bottle was added into the second reaction bottle. After stirring completely, a norbornene-containing solution (153.7 g of norbornene (NB) dissolved in 100 ml of toluene) was added into the second reaction bottle. Herein, 1-hexene had a molar percentage of 20 mol %, based on the total moles of vinyl norbornene (VNB) and norbornene. After the reaction was complete, 250 ml of ethyl vinyl ether was added into the second reaction bottle. After stirring overnight, the catalyst of the result was removed and then was purified by a reprecipitation with methanol. After concentration, Oligomer (III) (with a number average molecular weight (Mn) of 2,065) was obtained, wherein the ratio of the repeat unit

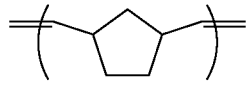

to the repeat unit

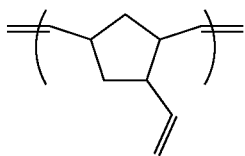

of Oligomer (III) was about 1:2.

Preparation Example 4

0.054 g of 1,3-bis(2,4,6-trimethylphenyl)-4,5-dihydro-imidazol-2-ylidene[2-(i-propoxy)-5-(N,N-dimethylamino-sulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.291 mol of 1-hexene, 35.3 g of vinyl norbornene (VNB), and 65 ml of toluene were added into a second reaction bottle. Next, the metal-catalyst-containing solution in the first reaction bottle was added into the second reaction bottle. After stirring completely, a norbornene-containing solution (110.8 g of norbornene (NB) dissolved in 150 ml of toluene) was added into the second reaction bottle. Herein, 1-hexene had a molar percentage of 20 mol %, based on the total moles of vinyl norbornene (VNB) and norbornene. After the reaction was complete, 75 ml of ethyl vinyl ether was added into the second reaction bottle. After stirring overnight, the catalyst of the result was removed and then was purified by a reprecipitation with methanol. After concentration, Oligomer (IV) (with a number average molecular weight (Mn) of 1,880) was obtained, wherein the ratio of the repeat unit

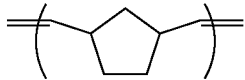

to the repeat unit

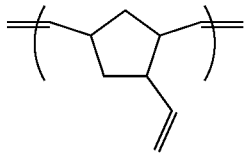

of Oligomer (IV) was about 4:1.

Preparation Example 5

0.054 g of 1,3-bis(2,4,6-trimethylphenyl)-4,5-dihydro-imidazol-2-ylidene[2-(i-propoxy)-5-(N,N-dimethylamino-sulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.735 mol of 1-hexene, 147.4 g of vinyl norbornene (VNB), and 180 ml of toluene were added into a second reaction bottle. Next, the metal-catalyst-containing solution in the first reaction bottle was added into the second reaction bottle. After stirring completely, a norbornene-containing solution (23.06 g of norbornene (NB) dissolved in 35 ml of toluene) was added into the second reaction bottle. Herein, 1-hexene had a molar percentage of 50 mol %, based on the total moles of vinyl norbornene (VNB) and norbornene. After the reaction was complete, 75 ml of ethyl vinyl ether was added into the second reaction bottle. After stirring overnight, the catalyst of the result was removed and then was purified by a reprecipitation with methanol. After concentration, Oligomer (V) (with a number average molecular weight (Mn) of 1.2541 was obtained, wherein the ratio of the repeat unit

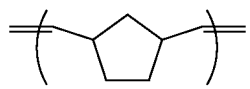

to the repeat unit

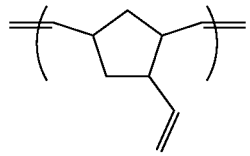

of Oligomer (V) was about 1:5.

Preparation Example 6

0.054 g of 1,3-bis(2,4,6-trimethylphenyl)-4,5-dihydro-imidazol-2-ylidene[2-(i-propoxy)-5-(N,N-dimethylamino-sulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.435 mol of 1-hexene, 44.2 g of vinyl norbornene (VNB), and 80 ml of toluene were added into a second reaction bottle. Next, the metal-catalyst-containing solution in the first reaction bottle was added into the second reaction bottle. After stirring completely, a norbornene-containing solution (103.5 g of norbornene (NB) dissolved in 135 ml of toluene) was added into the second reaction bottle. Herein, 1-hexene had a molar percentage of 30 mol %, based on the total moles of vinyl norbornene (VNB) and norbornene. After the reaction was complete, 75 ml of ethyl vinyl ether was added into the second reaction bottle. After stirring overnight, the catalyst of the result was removed and then was purified by a reprecipitation with methanol. After concentration, Oligomer (VI) (with a number average molecular weight (Mn) of 1.7461 was obtained, wherein the ratio of the repeat unit

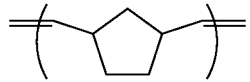

to the repeat unit

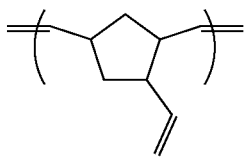

of Oligomer (V) was about 3:1.

Preparation Example 7

0.054 g of 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.044 mol of 1-hexene, 141.3 g of vinyl norbornene (VNB), and 180 ml of toluene were added into a second reaction bottle. Next, the metal-catalyst-containing solution in the first reaction bottle was added into the second reaction bottle. After stirring completely, a norbornene-containing solution (27.81 g of norbornene (NB) dissolved in 35 ml of toluene) was added into the second reaction bottle. Herein, 1-hexene had a molar percentage of 3 mol %, based on the total moles of vinyl norbornene (VNB) and norbornene. After the reaction was complete, 75 ml of ethyl vinyl ether was added into the second reaction bottle. After stirring overnight, the catalyst of the result was removed and then was purified by a reprecipitation with methanol. After concentration, Oligomer (VII) (with a number average molecular weight (Mn) of 7,539) was obtained, wherein the ratio of the repeat unit

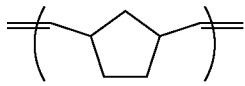

to the repeat unit

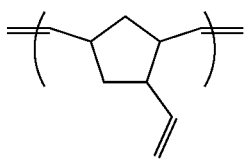

of Oligomer (V) was about 1:4.

Preparation Example 8

0.0018 g of 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 0.5 ml of toluene was added into the first reaction bottle, obtaining a metal-catalyst-containing solution. After the metal catalyst was dissolved in toluene completely, 0.043 mol of methyl acrylate, 3 g of vinyl norbornene (VNB), and 4.5 ml of toluene were added into a second reaction bottle. Next, the metal-catalyst-containing solution in the first reaction bottle was added into the second reaction bottle. After stirring completely, a norbornene-containing solution (2.36 g of norbornene (NB) dissolved in 5 ml of toluene) was added into the second reaction bottle. Herein, methyl acrylate had a molar percentage of 85 mol %, based on the total moles of vinyl norbornene (VNB) and norbornene. After the reaction was complete, 2.5 ml of ethyl vinyl ether was added into the second reaction bottle. After stirring overnight, the catalyst of the result was removed and then was purified by a reprecipitation with methanol. After concentration, Oligomer (VIII) (with a number average molecular weight (Mn) of 3,699) was obtained, wherein the ratio of the repeat unit

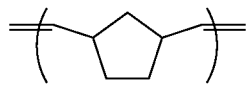

to the repeat unit

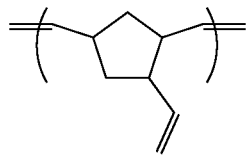

of Oligomer (V) was about 1:1 Oligomer (VIII) has a terminal group of

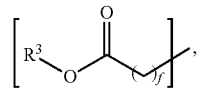

wherein f is 0; and, $R^3$ is methyl.

Preparation Example 9

0.018 g of 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 10 ml of toluene was added into the first reaction bottle, obtaining a metal-catalyst-containing solution. After the metal catalyst was dissolved in toluene completely, 0.247 mol of 1-octadecene, 29.4 g of vinyl norbornene (VNB), and 45 ml of toluene were added into a second reaction bottle. Next, the metal-catalyst-containing solution in the first reaction bottle was added into the second reaction bottle. After stirring completely, a norbornene-containing solution (23.06 g of norbornene (NB) dissolved in 20 ml of toluene) was added into the second reaction bottle. Herein, 1-octadecene had a molar percentage of 50 mol %, based on the total moles of vinyl norbornene (VNB) and norbornene. After the reaction was complete, 25 ml of ethyl vinyl ether was added into the second reaction bottle. After stirring overnight, the catalyst of the result was removed and then was purified by a reprecipitation with methanol. After concentration, Oligomer (IX) (with a number average molecular weight (Mn) of 871) was obtained, wherein the ratio of the repeat unit

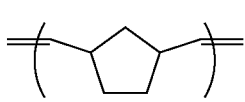

to the repeat unit

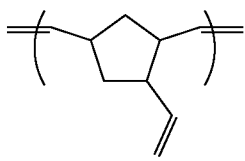

of Oligomer (V) was about 1:1.

Preparation Example 10

Preparation Example 10 was performed in the same manner as in Preparation Example 9 except that 1-octadecene was replaced with styrene, obtaining Oligomer (X) (with a number average molecular weight (Mn) of 1,936).

Preparation Example 11

Preparation Example 9 was performed in the same manner as in Preparation Example 9 except that 1-octadecene was replaced with 1,5-hexadiene, obtaining Oligomer (XI) (with a number average molecular weight (Mn) of 1,072).

Preparation Example 12

0.006 g of 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 4 ml of toluene was added into the first reaction bottle, obtaining a metal-catalyst-containing solution. After the metal catalyst was dissolved in toluene completely, 0.008 mol of 1-vinylcyclohexane, 9.8 g of vinyl norbornene (VNB), and 15 ml of toluene were added into a second reaction bottle. Next, the metal-catalyst-containing solution in the first reaction bottle was added into the second reaction bottle. After stirring completely, a norbornene-containing solution (7.69 g of norbornene (NB) dissolved in 7 ml of toluene) was added into the second reaction bottle. Herein, 1-vinylcyclohexane had a molar percentage of 5 mol %, based on the total moles of vinyl norbornene (VNB) and norbornene. After the reaction was complete, 8 ml of ethyl vinyl ether was added into the second reaction bottle. After stirring overnight, the catalyst of the result was removed and then was purified by a reprecipitation with methanol. After concentration, Oligomer (XII) (with a number average molecular weight (Mn) of 1,988) was obtained, wherein the ratio of the repeat unit

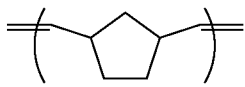

to the repeat unit

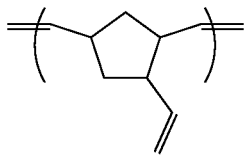

of Oligomer (V) was about 1:1. Oligomer (XII) has a terminal group of

wherein d is 0.

Preparation Example 13

Preparation Example 9 was performed in the same manner as in Preparation Example 9 except that 1-octadecene was replaced with allyl acetate, obtaining Oligomer (XIII) (with a number average molecular weight (Mn) of 2,779). Oligomer (XIII) has a terminal group of

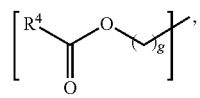

wherein g is 1, and $R^4$ is $CH_3$.

Preparation Example 14

Preparation Example 9 was performed in the same manner as in Preparation Example 9 except that the amount of 1-octadecene was reduced from 0.247 mol to 0.049 mol, obtaining Oligomer (XIV) (with a number average molecular weight (Mn) of 2,736).

The thermal decomposition temperature (Td) (1% weight loss) of Oligomer (II) and Oligomer (IX) are measured, and the results are shown in Table 1.

TABLE 1

|  | Oligomer (II) | Oligomer (IX) |
| --- | --- | --- |
| number average molecular weight (Mn) | 1033 | 871 |
| thermal decomposition temperature (° C.) | 110° C. | 75° C. |

As shown in Table 1, since the number average molecular weight (Mn) of Oligomer (IX) is less than 1,000, the Oligomer (IX) has a relatively low thermal decomposition temperature. As a result, the cured product of the film composition exhibits poor thermal endurance.

Preparation Example 15

0.054 g of 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride (as metal catalyst) was added into a first reaction bottle under nitrogen atmosphere, and then 30 ml of toluene was added into the first reaction bottle, obtaining a metal-catalyst-containing solution. After the metal catalyst was dissolved in toluene completely, 0.725 mol of 1-hexene, 177 g of vinyl norbornene (VNB), and 300 ml of toluene were added into a second reaction bottle. Next, the metal-catalyst-containing solution in the first reaction bottle was added into the second reaction bottle. Herein, 1-hexene had a molar percentage of 50 mol %, based on the moles of vinyl norbornene (VNB). After the reaction was complete, 75 ml of ethyl vinyl ether was added into the second reaction bottle. After stirring overnight, the catalyst of the result was removed and then was purified by a reprecipitation with methanol. After concentration, Oligomer (XV) (with a number average molecular weight (Mn) of 1,225) was obtained, wherein the all repeat units of Oligomer (XV) were

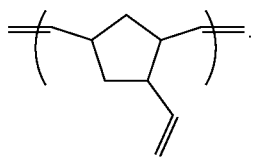

Preparation of Film Composition

Comparative Example 1

Oligomer (I) (100 parts by weight) and an initiator (1 part by weight, Luperox®101) was added into a reaction bottle, and then dissolved in xylene (20 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction under a temperature lower than 230° C. Since the film composition did not have any crosslinking agent and exhibited inferior film-forming ability, resulting in that no film was obtained after curing the film composition.

Example 1

Oligomer (I) (90 parts by weight), triallyl isocyanurate (TAIC) (10 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 2.

Example 2

Example 2 was performed in the same manner as in Example 1 except that the weight ratio of Oligomer (I) to triallyl isocyanurate is varied from 9:1 to 8:2, obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 2.

Example 3

Example 3 was performed in the same manner as in Example 1 except that the weight ratio of Oligomer (I) to triallyl isocyanurate is varied from 9:1 to 5:5, obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 2.

Example 4

Example 4 was performed in the same manner as in Example 1 except that the weight ratio of Oligomer (I) to triallyl isocyanurate is varied from 9:1 to 4:6, obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 2.

Example 5

Example 5 was performed in the same manner as in Example 1 except that the weight ratio of Oligomer (I) to triallyl isocyanurate is varied from 9:1 to 3:7, obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 2.

Comparative Example 2

Comparative Example 2 was performed in the same manner as in Example 1 except that the weight ratio of Oligomer (I) to triallyl isocyanurate is varied from 9:1 to 2:8, obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C. No film was obtained after curing the film composition.

Comparative Example 3

Oligomer (IV) (50 parts by weight), triallyl isocyanurate (50 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C. No film was obtained after curing the film composition.

Example 6

Oligomer (VI) (50 parts by weight), triallyl isocyanurate (50 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 2.

Example 7

Example 7 was performed in the same manner as in Example 6 except that Oligomer (VI) was replaced with Oligomer (II), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 2.

Example 8

Example 8 was performed in the same manner as in Example 6 except that Oligomer (VI) was replaced with Oligomer (III), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 2.

Example 9

Example 9 was performed in the same manner as in Example 6 except that Oligomer (VI) was replaced with Oligomer (VII), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 2.

Comparative Example 4

Comparative Example 4 was performed in the same manner as in Example 6 except that Oligomer (VI) was replaced with Oligomer (V), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C. No film was obtained after curing the film composition.

TABLE 2

| | oligomer (n:m) | cross-linking agent | weight ratio of oligomer to cross-linking agent | film-forming ability | glass transition temperature (° C.) | refractive index |
|---|---|---|---|---|---|---|
| Comparative Example 1 | Oligomer (I) (2:1) | — | 10:0 | Fair | — | — |
| Example 1 | Oligomer (I) (2:1) | TAIC | 9:1 | Good | 201 | 1.53138 |
| Example 2 | Oligomer (I) (2:1) | TAIC | 8:2 | Good | 187 | 1.53343 |
| Example 3 | Oligomer (I) (2:1) | TAIC | 5:5 | Good | 187 | 1.53203 |
| Example 4 | Oligomer (I) (2:1) | TAIC | 4:6 | Good | 203 | 1.53693 |
| Example 5 | Oligomer (I) (2:1) | TAIC | 3:7 | Good | 214 | 1.50133 |
| Comparative Example 2 | Oligomer (I) (2:1) | TAIC | 2:8 | Fair | — | — |
| Comparative Example 3 | Oligomer (IV) (4:1) | TAIC | 5:5 | Fair | — | — |
| Example 6 | Oligomer (VI) (3:1) | TAIC | 5:5 | Good | 172 | 1.53089 |
| Example 7 | Oligomer (II) (1:1) | TAIC | 5:5 | Good | 201 | 1.53240 |
| Example 8 | Oligomer (III) (1:2) | TAIC | 5:5 | Good | 219 | 1.53300 |
| Example 9 | Oligomer (VII) (1:4) | TAIC | 5:5 | Good | 190 | 1.53652 |
| Comparative Example 4 | Oligomer (V) (1:5) | TAIC | 5:5 | Fair | — | — |

Example 10

Oligomer (II) (90 parts by weight), triallyl cyanurate (TAC) (10 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 3.

Example 11

Example 11 was performed in the same manner as in Example 10 except that triallyl cyanurate (TAC) was replaced with trimethallyl isocyanurate (TMAIC), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 3.

Example 12

Oligomer (VI) (50 parts by weight), divinylbenzene (DVB) (50 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 3.

Example 13

Example 13 was performed in the same manner as in Example 10 except that triallyl cyanurate (TAC) was replaced with N,N'-bismaleimide-4,4'-diphenylmethane (BMI), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 3.

Example 14

Example 14 was performed in the same manner as in Example 10 except that triallyl cyanurate (TAC) was replaced with pentaerythritol tetraacrylate (PETTA), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 3.

Example 15

Oligomer (III) (80 parts by weight), SR368 (tris (2-hydroxyethyl) isocyanurate triacrylate) (20 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 3.

Example 16

Example 16 was performed in the same manner as in Example 10 except that triallyl cyanurate (TAC) was replaced with bis(vinylphenyl)ethane (BVPE), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 3.

Example 17

Example 17 was performed in the same manner as in Example 15 except that SR368 was replaced with SR833S (tricyclodecanedimethanol diacrylate), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 3.

Example 18

Oligomer (II) (70 parts by weight), 1,2,4-trivinyl cyclohexane (TVCH) (30 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 3.

Example 19

Example 19 was performed in the same manner as in Example 10 except that triallyl cyanurate (TAC) was replaced with dipentaerythritol hexaacrylate (DPHA), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 3.

TABLE 3

| | oligomer (n:m) | cross-linking agent | weight ratio of oligomer to cross-linking agent | film-forming ability | glass transition temperature (° C.) | refractive index |
|---|---|---|---|---|---|---|
| Example 10 | Oligomer (II) (1:1) | TAC | 9:1 | Good | 219 | 1.53355 |
| Example 11 | Oligomer (II) (1:1) | TMAIC | 9:1 | Good | 184 | 1.53018 |
| Example 12 | Oligomer (VI) (3:1) | DVB | 5:5 | Good | 161 | 1.53339 |
| Example 13 | Oligomer (II) (1:1) | BMI | 9:1 | Good | 215 | 1.52620 |
| Example 14 | oligomer (II) (1:1) | PETTA | 9:1 | Good | 202 | 1.53339 |
| Example 15 | Oligomer (III) (1:2) | SR368 | 8:2 | Good | 218 | 1.52798 |
| Example 16 | Oligomer (II) (1:1) | BVPE | 9:1 | Good | 161 | 1.53446 |
| Example 17 | Oligomer (III) (1:2) | SR833S | 8:2 | Good | 187 | 1.53258 |
| Example 18 | Oligomer (II) (1:1) | TVCH | 7:3 | Good | 188 | 1.53835 |
| Example 19 | Oligomer (II) (1:1) | DPHA | 9:1 | Good | 216 | 1.53306 |

Example 20

Oligomer (VIII) (70 parts by weight), divinylbenzene (DVB) (30 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 4.

Example 21

Oligomer (X) (50 parts by weight), triallyl isocyanurate (50 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 4.

Example 22

Example 22 was performed in the same manner as in Example 21 except that Oligomer (X) was replaced with Oligomer (XI), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 4.

Example 23

Oligomer (XII) (50 parts by weight), divinylbenzene (DVB) (50 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 4.

Example 24

Oligomer (XIII) (60 parts by weight), triallyl isocyanurate (40 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 4.

Example 25

Oligomer (XIV) (40 parts by weight), triallyl isocyanurate (60 parts by weight), and an initiator (1 part by weight, Luperox®101) were added into a reaction bottle, and then dissolved in xylene (30 parts by weight). After mixing completely, a film composition was obtained. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 4.

Example 26

Example 26 was performed in the same manner as in Example 2 except that Oligomer (I) was replaced with Oligomer (XV), obtaining a film composition. Next, the film composition was coated on a copper foil (manufactured and sold by Furukawa Circuit Foil Co., Ltd.). Next, the copper foil was then heated gradually and then the film composition was subjected to a crosslinking reaction at 230° C., obtaining a film. The refractive index of the film was measured by a reflectometer and the glass transition temperature of the film was measured using differential scanning calorimetry (DSC). The results are shown in Table 4.

TABLE 4

|  | oligomer (n:m) | cross-linking agent | weight ratio of oligomer to cross-linking agent | film-forming ability | glass transition temperature (° C.) | re-fractive index |
| --- | --- | --- | --- | --- | --- | --- |
| Example 20 | Oligomer (VIII) (1:1) | DVB | 7:3 | Good | 166 | 1.54715 |
| Example 21 | Oligomer (X) (1:1) | TAIC | 5:5 | Good | 165 | 1.50209 |
| Example 22 | Oligomer (XI) (1:1) | TAIC | 5:5 | Good | 165 | 1.54358 |
| Example 23 | Oligomer (XII) (1:1) | DVB | 5:5 | Good | 164 | 1.54904 |
| Example 24 | Oligomer (XIII) (1:1) | TAIC | 6:4 | Good | 173 | 1.53749 |
| Example 25 | Oligomer (XIV) (1:1) | TAIC | 4:6 | Good | 162 | 1.53365 |
| Example 26 | Oligomer (XV) (0:1) | TAIC | 8:2 | Good | 178 | 1.5461 |

It will be clear that various modifications and variations can be made to the disclosed methods and materials. It is intended that the specification and examples be considered as exemplary only, with the true scope of the disclosure being indicated by the following claims and their equivalents.

What is claimed is:

1. A film composition, comprising:
   a crosslinking agent; and
   an oligomer, wherein the weight ratio of the oligomer to the crosslinking agent is from 9:1 to 3:7, wherein the crosslinking agent is a compound having at least two crosslinkable functional groups or a bismaleimide, wherein the crosslinkable functional group is alkenyl group, methacrylate group, acrylate group, acryloyl group, epoxy group, carboxyl group, or a combination thereof, wherein the oligomer has a number average molecular weight (Mn) from 1,000 to 8,000, wherein the oligomer has a structure represented by Formula (I)

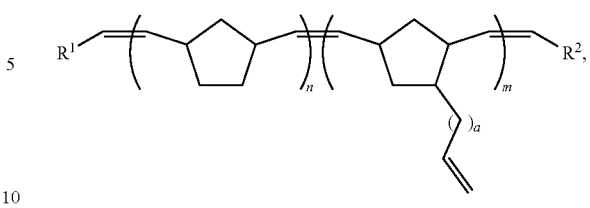

Formula (I)

wherein $R^1$ and $R^2$ are independently hydrogen, $C_{1-20}$ alkyl group, $C_{2-20}$ alkenyl group, $C_{6-12}$ aryl group, $C_{6-12}$ alkylaryl group, $C_{5-12}$ cycloalkyl group, $C_{6-20}$ cycloalkylalkyl group, alkoxycarbonyl group, or alkylcarbonyloxy group; $R^1$ is not hydrogen when $R^2$ is hydrogen; a is 0 or 1; n≥0; m≥1, and when n is not 0, the ratio of n to m is from 3:1 to 1:4; and the repeat unit

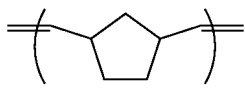

and the repeat unit

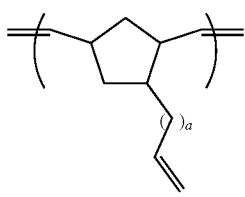

are arranged in a random or block fashion.

2. The film composition as claimed in claim 1, wherein $R^1$ and $R^2$ are independently hydrogen, or

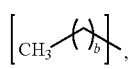

wherein b is 0, or an integer from 1 to 19; and, $R^1$ is not hydrogen when $R^2$ is hydrogen.

3. The film composition as claimed in claim 1, wherein $R^1$ and $R^2$ are independently hydrogen, or

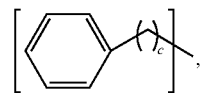

wherein c is 0, or an integer from 1 to 6; and, $R^1$ is not hydrogen when $R^2$ is hydrogen.

4. The film composition as claimed in claim 1, wherein $R^1$ and $R^2$ are independently hydrogen, or

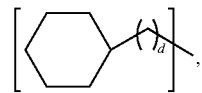

and wherein d is 0, or an integer from 1 to 6; and, $R^1$ is not hydrogen when $R^2$ is hydrogen.

5. The film composition as claimed in claim 1, wherein $R^1$ and $R^2$ are independently hydrogen, or

wherein e is 0, or an integer from 1 to 6; and, $R^1$ is not hydrogen when $R^2$ is hydrogen.

6. The film composition as claimed in claim 1, wherein $R^1$ and $R^2$ are independently hydrogen, or

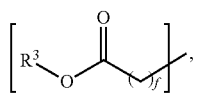

and wherein f is 0, or an integer from 1 to 6; $R^3$ is $C_{1-6}$ alkyl group; and, $R^1$ is not hydrogen when $R^2$ is hydrogen.

7. The film composition as claimed in claim 1, wherein $R^1$ and $R^2$ are independently hydrogen, or

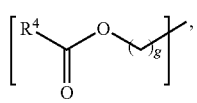

and wherein g is 0, or an integer from 1 to 6; $R^4$ is $C_{1-6}$ alkyl group; and, $R^1$ is not hydrogen when $R^2$ is hydrogen.

8. The film composition as claimed in claim 1, wherein $R^1$ and $R^2$ are independently hydrogen, or

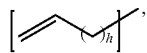

wherein h is an integer from 1 to 6; and, $R^1$ is not hydrogen when $R^2$ is hydrogen.

9. The film composition as claimed in claim 1, wherein $R^1$ and $R^2$ are independently hydrogen, or

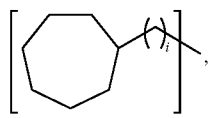

wherein i is 0 or an integer from 1 to 6; and, $R^1$ is not hydrogen when $R^2$ is hydrogen.

10. The film composition as claimed in claim 1, wherein $R^1$ and $R^2$ are independently hydrogen, or

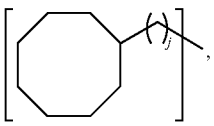

wherein j is 0 or an integer from 1 to 6; and, $R^1$ is not hydrogen when $R^2$ is hydrogen.

11. The film composition as claimed in claim 1, further comprising a solvent, wherein the ratio of the weight of the solvent to the total weight of the oligomer and the crosslinking agent is from 0.01 to 60.

12. The film composition as claimed in claim 1, wherein the crosslinking agent is a bismaleimide having a structure represented by Formula (II) or Formula (III)

Formula (II)

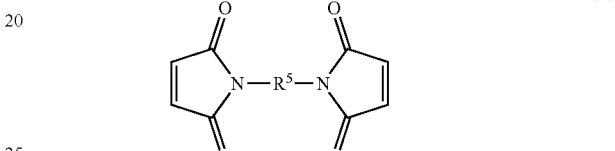

Formula (III)

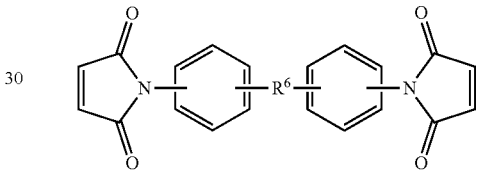

wherein $R^5$ is —$CR_2$—, —NR—, —C(O)$CH_2$—, —$CH_2OCH_2$—, —C(O)—, —O—, —O—O—, —S—, —S—S—, —S(O)—, —$CH_2S(O)CH_2$—, —(O)S(O)—, —$C_6R_4$—, —$CH_2(C_6R_4)CH_2$—, —$CH_2(C_6R_4)(O)$—, or substituted phenylene or substituted diphenylene; $R^6$ is —$CR_2$—, —C(O)—, —O—, —O—O—, —S—, —S—S—, —(O)S(O)— or —S(O)—; and R is independently hydrogen or $C_{1-4}$ alkyl group.

13. The film composition as claimed in claim 1, wherein the crosslinking agent is N'-bismaleimide-4,4'-diphenylmethane, 1,1'-(methylenedi-4,1-phenylene)bismaleimide, N,N'-(1,1'-biphenyl-4,4'-diyl) bismaleimide, N,N'-(4-methyl-1,3-phenylene)bismaleimide, 1,1'-(3,3' dimethyl-1,1'-biphenyl-4,4'-diyl)bismaleimide, N,N'-ethylenedimaleimide, N,N'-(1,2-phenylene)dimaleimide, N,N'-(1,3-phenylene)dimaleimide, N,N'-thiodimaleimide, N,N'-dithiodimaleimide, N,N'-ketonedimaleimide, N,N'-methylene-bis-maleinimide, bis-maleinimidomethyl-ether, 1,2-bis-(maleimido)-1,2-ethandiol, N,N'-4,4'-diphenylether-bis-maleimid, or 4,4'-bis(maleimido)-diphenylsulfone.

14. A film, which is a cured product of the film composition as claimed in claim 1.

* * * * *